: 2,878,255
Patented Mar. 17, 1959

2,878,255

DIXYLYL PHOSPHORAMIDATES

Arthur Dock Fon Toy, Park Forest, and Guy A. McDonald, Chicago Heights, Ill., assignors to Victor Chemical Works, a corporation of Illinois No Drawing. Application November 23, 1955
Serial No. 548,772

2 Claims. (Cl. 260—461)

This invention relates to dixylyl phosphoramidates and admixtures thereof.

These new compounds are the various isomers of dixylyl phosphoramidate and may be represented by the following formula:

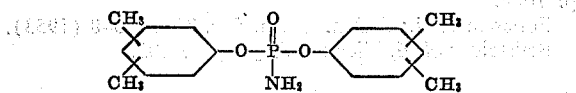

wherein the methyl radicals may be attached to any of 2, 3, 4, 5, or 6 positions on the benzene radicals.

These new compounds may be made by reacting dixylyl chlorophosphate with ammonia and removing the hydrogen chloride which is thus formed according to the following formula:

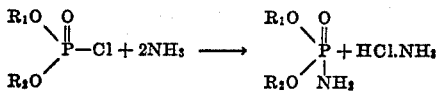

wherein

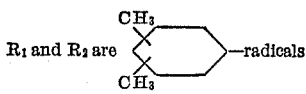

Either an aqueous ammonia solution may be used for the reaction or gaseous ammonia may be bubbled through the chlorophosphate until the reaction is complete.

The dixylyl chlorophosphate may be made by reacting commercially available mixed xylenols with phosphorous oxychloride with or without the addition of a catalyst such as magnesium chloride, aluminum chloride, etc., as is well known in the art and shown in the following working examples.

Since six isomers of xylenol are known (for example: 2,3-; 3,4-; 2,6-; 2,4-; 3,5-; and 2,5-isomers), and all boil within the range of about 211–225° C., it is difficult, if not impossible, to separate the isomers. The new products of this invention are necessarily mixtures of these isomers. The commercial xylenol also generally contains small amounts of ethyl phenol, which has the same molecular weight as xylenol, and varying amounts of cresol.

Example 1

970 g. of mixed commercial xylenols (boiling range: 5% at less than 202° C., 50% at less than 207° C., 95% at less than 222° C.) were placed in a two liter, single neck flask with 614 g. of phosphorous oxychloride and 15 g. of anhydrous $MgCl_2$. A reflux condenser was connected and the mixture was heated to reflux. Refluxing began around 70° C. and continued until the temperature had risen to 226° C. after approximately 7½ hours. Evolution of HCl was negligible at this point. The material was transferred to a distilling flask and the low boiling fractions removed by distilling to a temperature of 165° C. at a pressure of 3 mm. of mercury. 1113.5 g. of dixylyl chlorophosphate remained in the flask. Analysis: 9.45% P, 9.15% Cl.

To make the dixylyl phosphoramidate, 800 cc. of aqueous ammonia was added to a two liter 3-neck flask equipped with an agitator and means for cooling. 381 g. of dixylyl chlorophosphate from the above example were then added in 49 minutes keeping the temperature between 20–25° C. The mixture was stirred for an additional 18 minutes. 300 cc. of benzene were added and, following separation and drying of the benzene layer with anhydrous magnesium sulfate, the benzene was distilled off to a temperature of 102° C. at 1.5 mm. of mercury to yield 337.6 g. of a dixylyl phosphoramidate product which analyzed 9.7% P, 3.7% N, Cl⁻ nil. It had a specific gravity of $$1.1733 \tfrac{25}{25}$$

Example 2

Dixylyl chlorophosphate was prepared as in Example 1 using a commercial xylenol which contained 90% high boiling xylenols and 7% low boiling xylenols with a boiling range such that 50% of the material boiled at over 220° C. The resulting dixylyl chlorophosphate analyzed 9.14% P, 11.2% Cl. 500 g. of this material and 500 g. of benzene were placed in a two liter, 3-neck flask equipped with an agitator and cooling bath. Gaseous ammonia was then passed into the charge at 26–28° C. for 1 hour and 51 minutes at which time the temperature began to drop and much ammonia was lost. 3 cc. of water was added to the mixture and it was stirred for one hour. It was then filtered and the precipitate washed with 400 cc. of benzene. The filtrate and benzene wash were put in a two liter distilling flask and the benzene was removed under partial vacuum. It was further stripped of benzene by heating to 100° C. at 4 mm. of mercury. The resulting dixylyl phosphoramidate weighed 456.8 g. and analyzed 9.7% P, 4.49% N, Cl⁻ nil.

The dixylyl phosphoramidates of this invention may be used as gasoline additives. They are completely soluble in gasoline and have been shown to exert no destructive effect upon the antiknock protection resulting from the addition of tetraethyl lead to gasoline. These new compounds also act to reduce the harmful condition known as surface ignition. This latter difficulty is caused by deposits within an engine cylinder which continue to glow after the firing cycle and thus prematurely ignite the following fuel charge.

As a specific instance, the product of Example 1 was added to a commercial gasoline containing 3.2 grams of lead per gallon as tetraethyl lead and the usual small amounts of ethylene dibromide and ethylene dichloride. Sufficient dixylyl phosphoramidate was added so that the phosphorous-to-lead atom ratio was about 0.4:3. The treated and untreated gasolines were then comparatively tested in an engine which was equipped to electronically record the number of surface ignitions. It was found that the gasoline containing dixylyl phosphoramidate caused approximately an 80% reduction in surface ignition and that there was no loss in antiknock quality.

An outstanding characteristic of the dixylyl phosphoramidates is their complete solubility in gasoline. As a comparison it has been found that dicresyl phosphoramidate prepared from U. S. P. cresol is only soluble to the extent of 1–2% in gasoline. In this respect we have found that the extreme solubility of the dixylyl phosphoramidates is sufficient to solubilize mixtures containing as high as fifty percent of the cresyl phosphoramidate.

To illustrate this point a mixture of U. S. P. cresol and a commercial xylenol containing 88% xylenols and 11% cresols was compounded so as to contain 50.1% mixed xylenols, 46.7% mixed cresols and 2.6% phenol. This mixture was used to make a compound very closely approximating xylyl cresyl chlorophosphate which analyzed 10.1% P and 11.6% Cl. This was converted to xylyl cresyl phosphoramidate in accordance with the method of the preceding examples. The product analyzed 10.6% P, 5.1% N, Cl⁻ nil, and was found to be approximately 18% soluble in gasoline. The fact that products containing this high content of relatively insoluble cresyl esters are made soluble in gasoline by the highly soluble xylyl esters is important since the effectiveness as a gasoline additive is apparently related to the phosphorous content of the compound. The lower average molecular weight of the mixture tends to increase the phosphorous content of the molecule. This is important since most commercial xylenols contain some cresol. Thus the dixylyl phosphoramidates of the present invention contemplate the inclusion of such dicresyl phosphoramidates as may result from the cresol normally present in commercial grades of xylenol.

In the following claims, the terms "substantial proportion" is intended to refer to compositions containing at least 50% of a compound, or admixture of compounds, having the following structural formula:

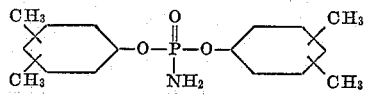

The foregoing detailed description has been given for clearness of understanding only, and no unnecessary limitations should be understood therefrom, as modifications will be obvious to those skilled in the art.

We claim:
1. A composition containing a substantial proportion of an admixture of compounds having the following structural formula:

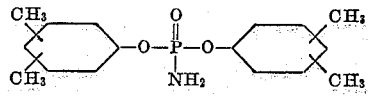

2. A dixylyl phosphoramidate.

References Cited in the file of this patent
UNITED STATES PATENTS
2,441,331    Reiff et al. _____ May 11, 1948

FOREIGN PATENTS
201,549    Switzerland _____ Dec. 15, 1938

OTHER REFERENCES
Tamayo et al.: Chemical Abstracts, vol. 45 (1950), p. 7046.
Forsman et al.: J. Am. Chem. Soc. 75, 3145–8 (1953).
Beilstein, vol. 6, Vierte auflage, page 402.